United States Patent
Taha (10) Patent No.: US 6,551,093 B2
(45) Date of Patent: Apr. 22, 2003

(54) MOLD ASSEMBLY FOR A CONTAINER CLOSURE

(76) Inventor: Saad Taha, 5253 Plano Pkwy., Plano, TX (US) 75093

( * ) Notice: Subject to any disclaimer, the term of this patent is extended or adjusted under 35 U.S.C. 154(b) by 82 days.

(21) Appl. No.: 09/842,990

(22) Filed: Apr. 26, 2001

(65) Prior Publication Data

US 2002/0001637 A1 Jan. 3, 2002

Related U.S. Application Data

(63) Continuation-in-part of application No. 09/605,273, filed on Jun. 28, 2000.

(51) Int. Cl.⁷ .............................................. B29C 45/44
(52) U.S. Cl. ................. 425/556; 425/577; 425/DIG. 58
(58) Field of Search .......................... 425/577, DIG. 58, 425/809, 556

(56) References Cited

U.S. PATENT DOCUMENTS

| | | | |
|---|---|---|---|
| 3,217,397 A | | 11/1965 | Voss |
| 3,325,576 A | | 6/1967 | Kessler |
| 3,555,606 A | | 1/1971 | Hedgewick |
| 3,904,165 A | * | 9/1975 | Den Boer .................. 425/577 |
| 3,940,103 A | | 2/1976 | Hilaire |
| 4,155,698 A | | 5/1979 | Aichinger |
| 4,496,302 A | | 1/1985 | Brown |
| 4,526,282 A | | 7/1985 | Dutt et al. |
| 4,560,077 A | | 12/1985 | Dutt |
| 4,564,112 A | | 1/1986 | Breuer |
| 4,881,892 A | | 11/1989 | Webster et al. |
| 5,114,655 A | | 5/1992 | Cole |
| 5,421,717 A | * | 6/1995 | Hynds ......................... 425/809 |
| 6,019,592 A | | 2/2000 | Thakor et al. |

FOREIGN PATENT DOCUMENTS

| | | |
|---|---|---|
| DE | 79 33 540 | 4/1980 |
| FR | 1270357 | 7/1961 |
| GB | 1446505 | 8/1976 |
| GB | 2 039 817 A | 8/1980 |
| WO | WO 00 10888 A1 | 3/2000 |
| WO | WO 00 34133 A3 | 6/2000 |

* cited by examiner

*Primary Examiner*—Tim Heitbrink
(74) *Attorney, Agent, or Firm*—Alvin R. Wirthlin; Akin Gump Strauss Hauer & Feld LLP (57) ABSTRACT

A mold assembly for a container closure includes a mold portion with a stripper ring adapted for engaging a shoulder of the closure, and a threaded core having an external, asymmetrical helical thread defining an internal, asymmetrical helical thread of the closure. The external, asymmetrical helical thread has a ramped surface defining a ramped surface of the internal, asymmetrical helical thread. Relative linear movement between the stripper ring and the threaded core causes withdrawal of the threaded core from the closure in a linear direction. The ramped surfaces of the internal and external, asymmetrical helical threads cooperate to facilitate the withdrawal.

14 Claims, 12 Drawing Sheets

MOLD ASSEMBLY FOR A CONTAINER CLOSURE

CROSS-REFERENCE TO RELATED APPLICATIONS

This is a Continuation-in-Part of U.S. patent application Ser. No. 09/605,273 filed on Jun. 28, 2000.

BACKGROUND OF THE INVENTION

This invention relates in general to container closures, and more particularly to a mold assembly and method for forming container closures that have multiple sealing surfaces and a tamper-evident ring.

Various tamper-evident closures have been proposed wherein a threaded cap has a skirt portion with internal threads for connecting the cap to the threaded neck of a container. A security ring is typically formed during molding of the cap and frangible connections are formed after molding by cutting or slitting openings into the closure at the juncture of the security ring and skirt portion. The security ring may be provided with a plurality of circumferentially spaced, inwardly and upwardly extending tabs or fingers integrally connected to the ring. The outer free ends of the fingers are adapted to engage beneath a shoulder or ledge on the container neck below the threaded portion. In this manner, the cap is prevented from being removed from the container until twisted a sufficient distance to break the frangible connection and thereby separate the cap from the ring.

Closures of the above-mentioned type are typically manufactured with medium or high density polyethylene materials through die casting or thermoforming. The materials must be sufficiently resilient and flexible to enable extraction of the male die member from the cavity of the closure despite the presence of the inwardly and upwardly extending fingers. Since the closures are anchored to the container mainly by engagement of the fingers with the shoulder or ledge, the required flexibility and resilience of the closure to enable separation from the die may also enable the closure to be relatively easily removed from the container without breaking the frangible connection between the skirt and the security ring by slipping the closure off the container in a direction parallel with the axis of the container neck. This is particularly disadvantageous since there is no clear indication that the container has been tampered with.

In recognition of this problem, UK Patent Application No. GB 2 039 817 proposes die molding a closure out of relatively rigid plastics material, such as polypropylene. However, the die-molding process itself is relatively time consuming and therefore contributes to an increase in the cost of manufacturing the closure. In addition, the formation of frangible bridges requires a further processing step wherein openings between the bridges are cut or slit at the intersection of the security ring and skirt portion of the closure. The extra processing step requires extra equipment, time, and energy and thereby contributes to the overall cost of the closure.

Other closure designs depend on adding a different material on the bottom surface of the closure top wall to maintain sealing against leakage. The addition of any material to the cap requires more steps in manufacturing and assembly, and also contributes to an increase in closure manufacturing costs. Thus, it is desirous to produce a closure that is of single piece construction.

As desirable as the one-piece plastic closure may be, there are a number of problems associated with its use. For example, it is difficult to maintain a seal between the closure and container over an extended period of time under various conditions of packing, storing and handling. Once the closure is firmly engaged on the container, whether by threads or some other means, various parts of the closure are under stress because of forces required to effect a seal. These stresses tend to cause cold flow or creep of the closure material and may cause a breach in the seal between the closure and container. This tendency is augmented when the closure and container are subject to internal pressure from carbonated beverages. A plastic material's tendency to creep is further affected by elevated temperatures, which may result in a breach of the seal and consequential leakage and/or spoilage of the contents.

Even when the closure is sufficient to retain the beverage in a carbonated state, removal of the closure for dispersing the beverage causes seal degradation to the point where the closure cannot retain its prior sealing ability. Consequently, the beverage will lose much of its carbonation in a relatively short period of time and is often discarded before being completely consumed.

In addition to the above drawbacks, the internal threads in prior art closures are typically symmetrical in cross section. Although this construction may facilitate attachment of the closure to the container, the internal threads of the closure may not properly seal against the external threads of the container. Moreover, the molding process for closures with threads that are symmetrical in cross section typically requires the core mold to be rotated or unscrewed from the interior of the closure after closure formation. This is a time consuming process and is much less efficient than if the core mold were to be withdrawn from the formed closure without rotation.

SUMMARY OF THE INVENTION

According to the invention, a mold assembly for a container closure is disclosed. The container closure has an end wall and a skirt extending from the end wall. The skirt includes an inner skirt surface with an internal, asymmetrical helical thread formed thereon for engaging an external helical thread of a container. The internal, asymmetrical helical thread has a ramped surface. A security ring is frangibly connected to the skirt, and a shoulder extends between the security ring and the skirt. The mold assembly comprises first and second mold portions cooperating to define, in a closed position, a closure cavity. The second mold portion has a stripper ring adapted for engaging the shoulder of the closure, and a threaded core having an external, asymmetrical helical thread defining the internal, asymmetrical helical thread of the closure. The external, asymmetrical helical thread has a ramped surface defining the ramped surface of the internal, asymmetrical helical thread. With this arrangement, relative linear movement between the stripper ring and the threaded core causes withdrawal of the threaded core from the closure in a linear direction, with the ramped surfaces of the internal and external, asymmetrical helical threads cooperating to facilitate the withdrawal.

Further according to the invention, a mold assembly for a container closure having an end wall, an annular seal and a skirt extending from the end wall and a frangible security ring extending from the skirt, comprises first and second mold portions cooperating to define, in a closed position, a closure cavity. The second mold portion has a threaded core and an inner core located in the threaded core. The inner core and threaded core cooperate to define an annular seal on the end wall of the closure. Relative movement between the inner core and threaded core creates a first clearance space into which the annular seal can deform during ejection of the closure from the mold assembly. An outer core surrounds the threaded core. The outer core and threaded core cooperate to define at least an inwardly extending flap portion of the security ring. Relative movement between the outer core and threaded core creates a second clearance space into which the flap portion of the security ring can deform outwardly during ejection of the closure from the mold assembly.

These and other features and advantages of the invention will become apparent upon reference to the following detailed description and the accompanying drawings.

BRIEF DESCRIPTION OF THE DRAWINGS

The preferred embodiments of the present invention will hereinafter be described in conjunction with the appended drawings wherein.

It is noted that the drawings are intended to represent only typical embodiments of the invention and therefore should not be construed as limiting the scope thereof. The invention will now be described in greater detail with reference to the drawings, wherein like parts throughout the drawing figures are represented by like numerals.

DETAILED DESCRIPTION OF THE PREFERRED EMBODIMENTS

Figure 1:
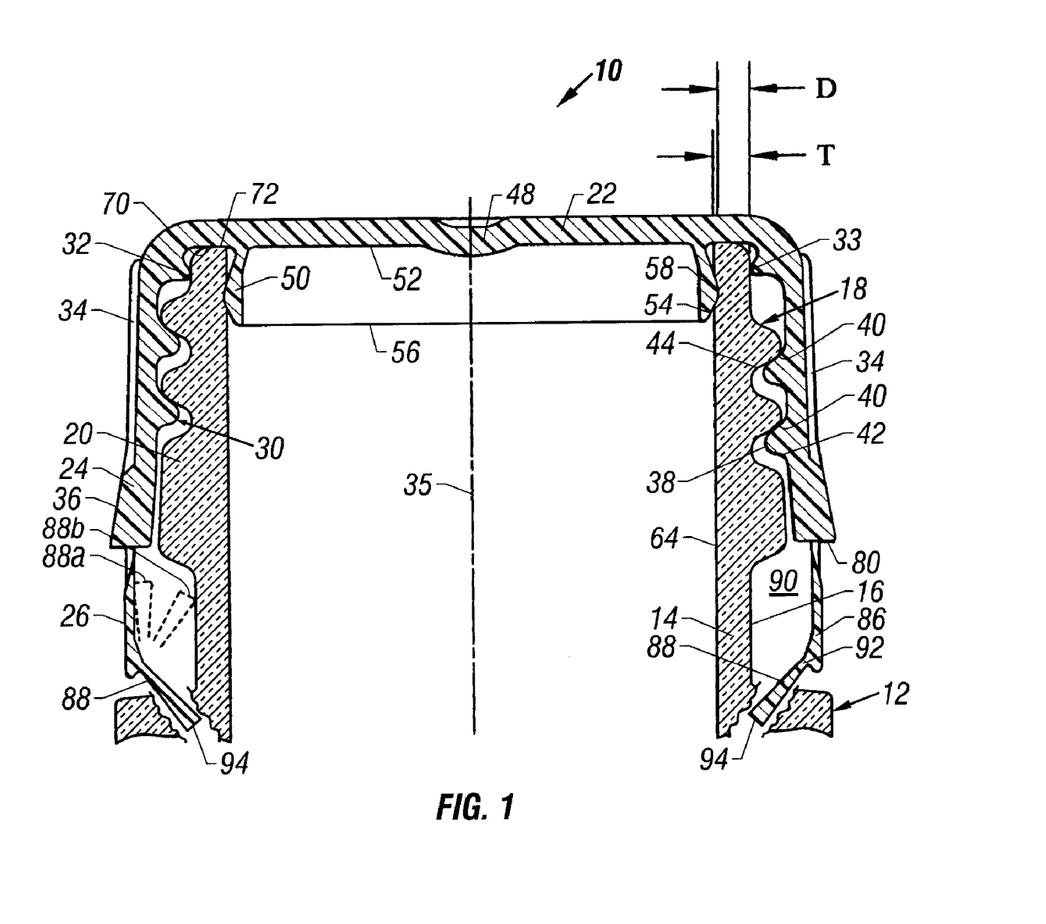
FIG. 1 is an enlarged cross sectional view of a container closure according to the invention mounted on the neck of a container.
Figure 2:
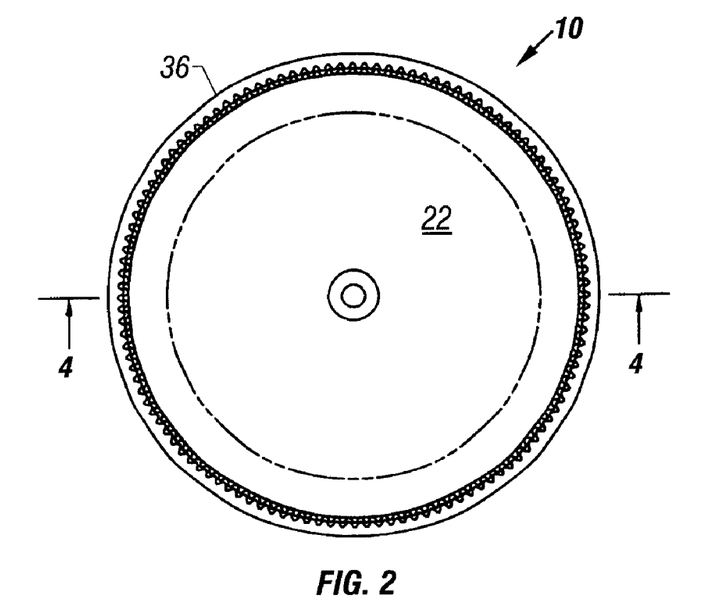
FIG. 2 is a top plan view of a container closure according to the invention.

Referring now to the drawings, and to FIG. 1 in particular, an exemplary embodiment of a closure 10 for connection to a container 12 is illustrated. An upper end of the container 12 includes a neck portion 14 with an external helical thread 18 and an annular shoulder 20 formed on an outer surface 16 thereof. As shown, the shoulder 20 is located below the thread 18 in a well known arrangement.

The closure 10 includes an upper or end wall 22 and a skirt 24 that is integrally formed with and extends downwardly from the upper wall. As shown, the skirt 24 is generally cylindrical in shape but may be conical or of some other shape in order to accommodate the shape of the neck portion 14. A tamper-evident security ring 26 may be frangibly connected to a lower end of the skirt 24. The closure 10, including the upper wall, skirt and security ring 26, is preferably integrally formed from a relative stiff plastic material, such as polypropylene, through injection molding, although other known forming processes may be used.

With additional reference to FIGS. 2 through 5, the skirt 24 includes an inner surface 28 with an internal helical thread 30 formed thereon for engaging the external helical thread 18 of the neck portion 14 when the closure 10 is installed on the container 12. A first annular seal 32 is formed integral with the inner surface 28 and extends generally radially inwardly toward a central axis 35 of the closure 10. An apex area 33 of the first annular seal 32 is adapted to sealingly engage the outer surface 16 of the neck portion 14 above the external thread 18. A plurality of ribs 34 are formed on an outer surface 36 of the skirt 24 to enhance gripping of the closure by a user.

Figure 8:
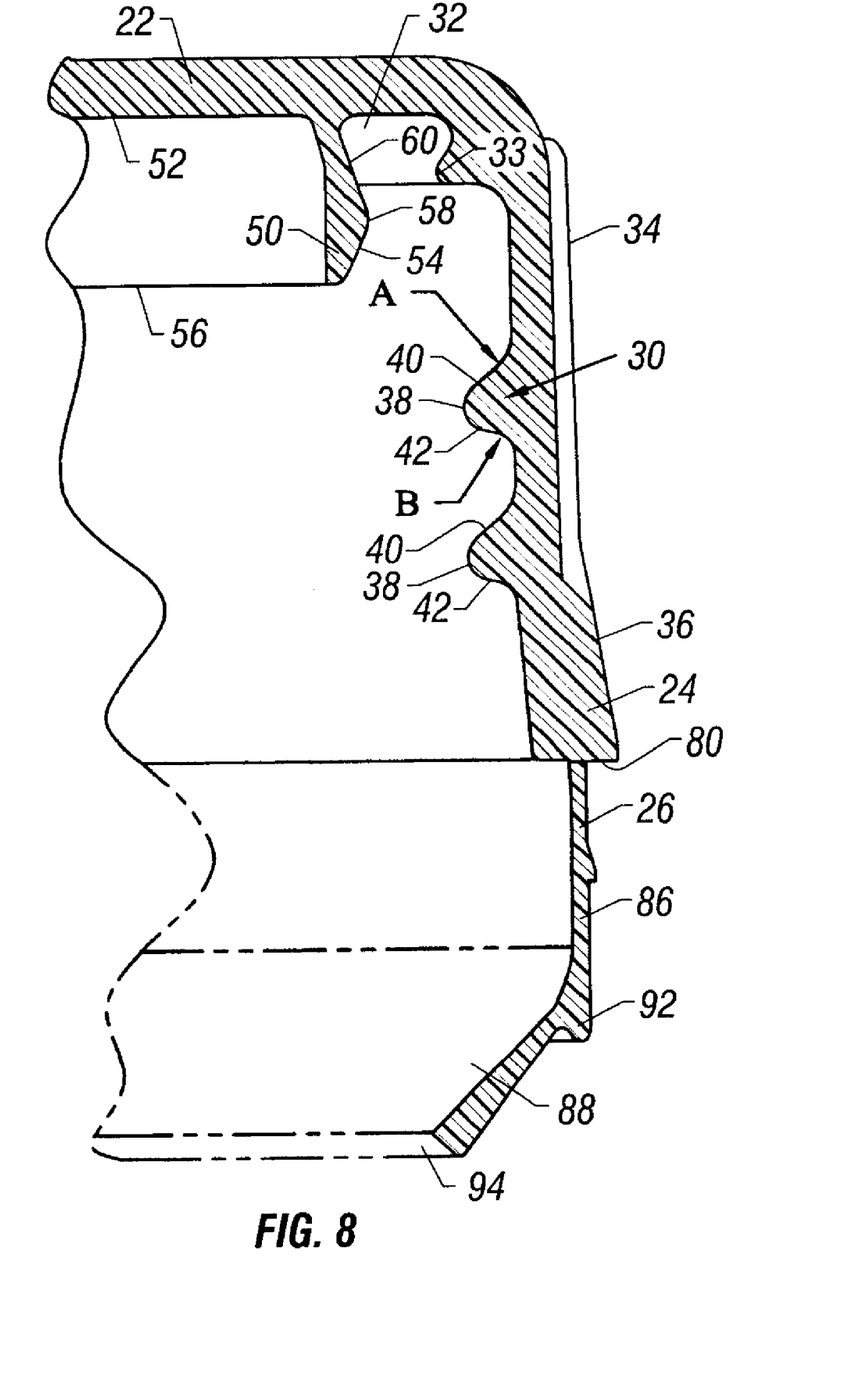
FIG. 8 is an enlarged cross sectional view of a portion of the container closure illustrating the thread and seal details.

With reference now to FIG. 8, the internal helical thread 30 includes a crown 38 integrally formed with an upper curved surface 40 with a first radius A and a lower curved surface 42 with a second radius B that is different from the first radius A to thereby form an internal thread that is asymmetrical in cross section. Preferably, the first radius A is greater than the second radius B. This arrangement is especially advantageous during the molding process. The upper curved surface of the internal thread 30 and the corresponding mold or core surface (not shown) facilitate removal of the core from the interior of the closure in a linear direction parallel with the closure central axis 35 without stripping the internal thread 30. This feature greatly increases the closure production rate and decreases mold costs over the prior art where the core must be rotated out of the closure interior. Linear removal of the core is preferably accomplished while the material is still warm, but after it is set in the mold. The lower surface 80 of the skirt may be in contact with a movable mold section during the molding process so that the closure 10 may be linearly ejected from the core mold.

The asymmetric cross sectional shape of the internal thread 30 also allows for greater variation in container tolerance and external thread shape since more surface area on the upper surface 40 is available for contacting a lower surface 44 (FIG. 1) of the external thread 18 on the neck portion 14 when the closure 10 is attached to the neck portion. As shown in FIG. 1, the upper surface 40 of the internal thread 30 may be different in curvature or slope than the lower surface 44 of the external thread 18 to accommodate a wide variety of external thread shapes and tolerances. The asymmetric cross sectional shape of the internal thread 30 assures that full contact is maintained between the external thread 18 of the neck portion 14 and the internal thread 30. This feature minimizes the deformation that may occur due to a rise in pressure in the container 12.

Figure 6:
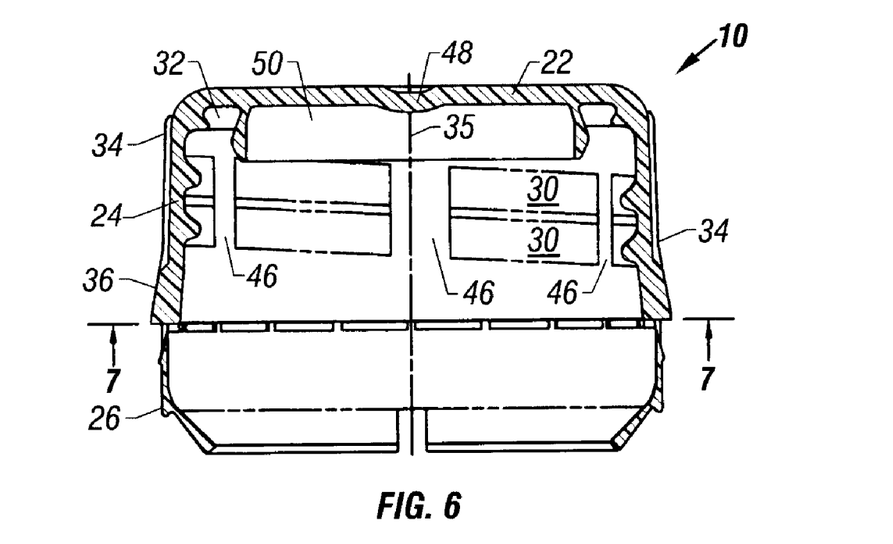
FIG. 6 is a cross sectional view similar to FIG. 4 of a container closure according to a further embodiment of the invention.
Figure 7:
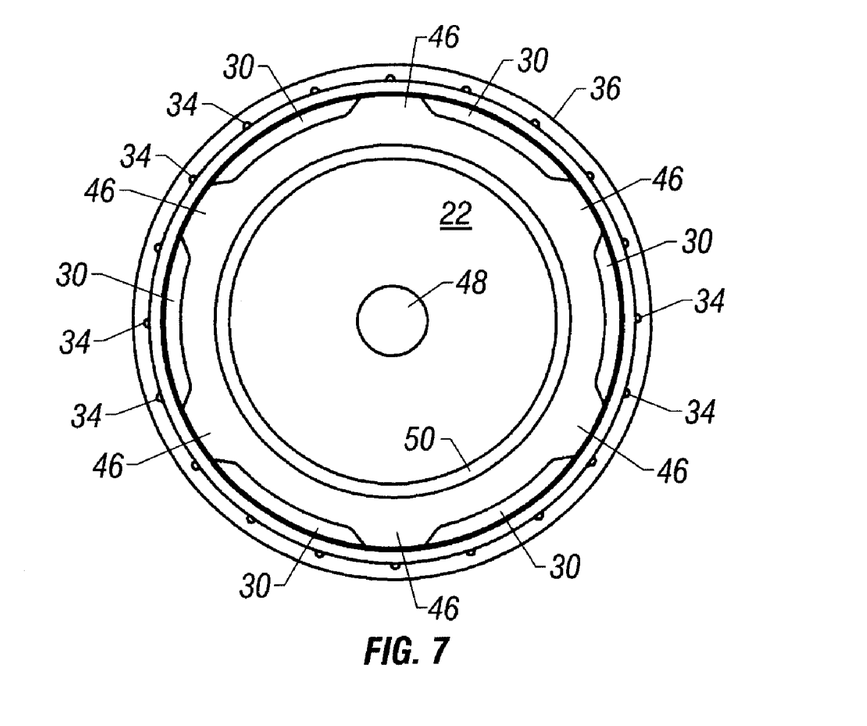
FIG. 7 is a cross sectional view of the container closure taken along line 7—7 of FIG. 6.

As shown in FIGS. 6 and 7, and according to a further embodiment of the invention, the internal helical thread 30 may be interrupted by circumferentially spaced vent slots 46. The number of vent slots 46 preferably match the number of vent slots (not shown) extending through the external helical thread 18 of the neck portion 14 when so equipped. The vent slots 46 are normally out of alignment with the vent slots of the container when the closure 10 is fully seated to thereby enhance the maximum pressure to which the closure 10 can be exposed without bursting or leaking. In a preferred embodiment, the closure 10 is designed to withstand pressures of about 175 psi or more. This embodiment is especially suitable for carbonated beverage containers, since initial twisting of the closure will cause the vents in the closure and container to at least partially align and release any pressure within the container before the internal and external threads are disengaged.

Referring now to FIGS. 1, 3, 4 and 8, the upper wall 22 includes a depression 48 formed therein and a second annular seal 50 formed on a lower surface 52 of the upper wall 22. The depression 48 is coincident with an injection port of an injection molding machine (not shown) during formation of the closure 10. Where other molding processes are used, the depression 48 may be eliminated. The second annular seal 50 extends in a generally axial direction and includes an upwardly sloped surface 54 that extends outwardly and upwardly from a lower edge 56 to a seal apex area 58 and a downwardly sloped surface 60 that extends outwardly and downwardly from the lower surface 52 of the upper wall 22 to the seal apex area 58. The apex area 58 of the second annular seal 50 is adapted to sealingly engage the inner surface 64 of the neck portion 14 above the external thread 18. Preferably, the distance "D" between the apex area 33 of the first annular seal 32 and the apex area 58 of the second annular seal 50 is less than the thickness "T" of the neck portion 14 between the apex areas, as shown in FIG. 1. In this manner, the first and second annular seals are biased tightly against the neck 14 and create a double seal between the closure 10 and container 12. A third annular seal 70 is provided by the bottom surface 52 of the upper wall 22 between the first and second annular seals 32, 50. The third annular seal 70 is in sealing engagement with an upper edge 72 of the neck portion 14 when the closure is completely installed on the container.

With this arrangement, the contents within the container 12 are isolated from the atmosphere outside the container by three separate annular seals. The shape of the annular seals creates a positive sealing engagement with the neck portion 14 without excessive friction that would otherwise require additional torque to open and close the container 12. The provision of three seals is especially advantageous when the container and closure are subjected to internal pressure, such as when a carbonated beverage is located in the container. Under internal pressure, the upper wall will tend to bow outwardly, which in turn will cause the first annular seal 32 to increase its contact pressure with the outer surface 16 of the neck portion 14. Concurrently, the contact pressure between the second annular seal 50 and the inner surface 64 of the neck portion 14 will increase. In addition, the multiplicity of annular seals (besides the sealing engagement between the internal and external threads) assures that the contents of the container will remain sealed even if one or two of the annular seals were to fail. In this manner, carbonated beverages can maintain their carbonation for longer periods of time than prior art closures, even when the closure 10 of the present invention has been removed and reinstalled on the container.

Figure 3:
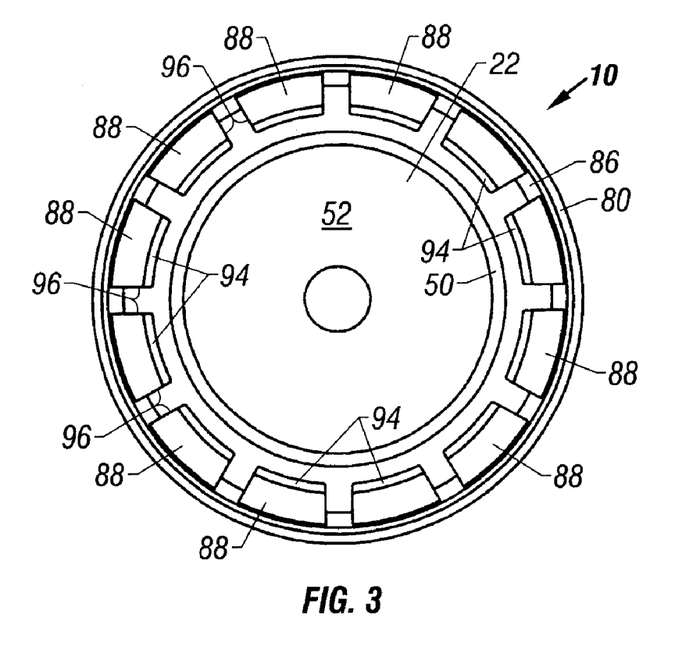
FIG. 3 is a bottom plan view of the container closure.
Figure 4:
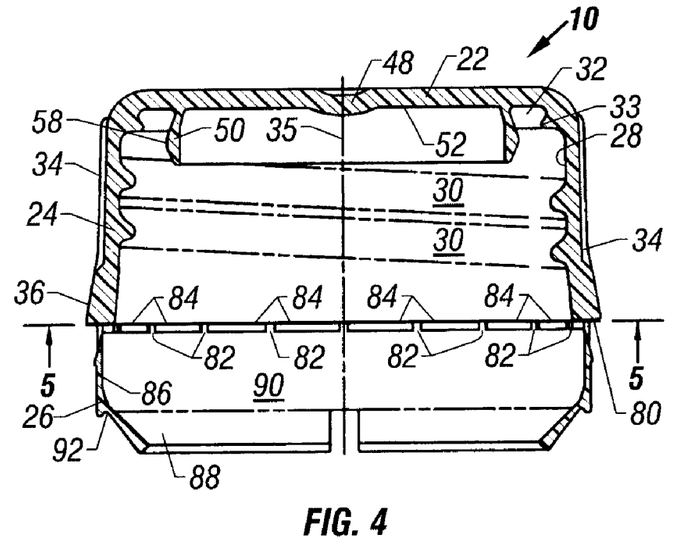
FIG. 4 is a cross sectional view of the container closure taken along line 4—4 of FIG. 2.
Figure 5:
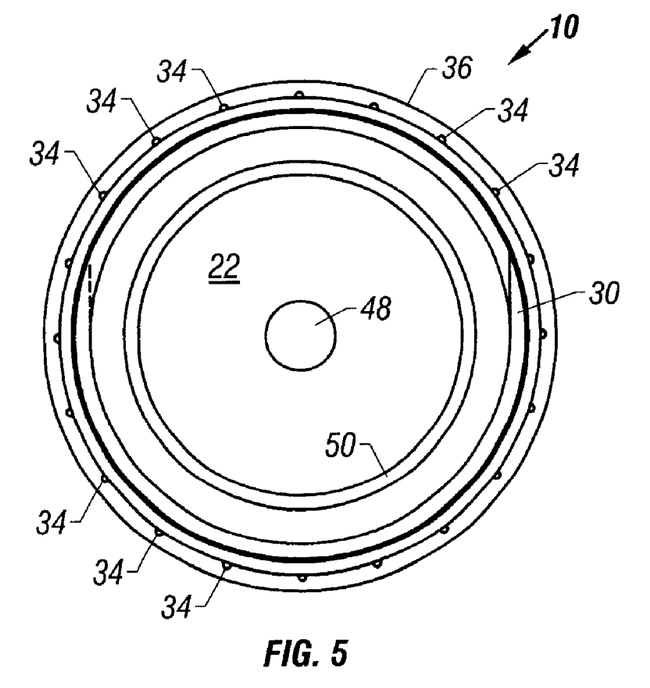
FIG. 5 is a cross sectional view of the container closure taken along line 5—5 of FIG. 4.

As shown most clearly in FIGS. 1, 3, 4 and 8, the security ring 26 is connected to a lower surface 80 of the skirt 24 through circumferentially spaced ribs 82 that are separated by windows or slots 84. The ribs 82 are preferably of sufficient thickness and width to resist forces that may occur during installation of the closure 10 on the container 12. The security ring 26 includes an annular wall 86 and a plurality of circumferentially spaced retaining tabs 88 connected to an inner surface 90 of the annular wall through integral hinges 92. When formed, the tabs 88 preferably initially extend at an obtuse angle with respect to the annular wall 86 to facilitate removal of the core mold. A subsequent forming operation may include bending the tabs 88 to form a perpendicular or acute angle with the annular wall 86 by pressing a mandrel or the like against the tabs until they are plastically deformed to the desired position. In this manner, less force is required to install the closure 10 on the container 12. The tabs 88 as shown in FIG. 8 gradually increase in thickness from the integral hinge 92 to an outer free end 94 thereof. Alternatively, the tabs may be of constant or decreasing thickness. As shown in FIG. 3, the outer free ends 94 of the tabs 88 are concave. In a further embodiment, the outer free ends may be straight or convex. Moreover, although the tabs are shown as separate from each other, they may be joined at their radially extending edges 96 through a flexible web or the like.

With reference again to FIG. 1, a capping operation wherein the closure 10 is secured on the neck portion 14 of the container 12 will now be described. Initially, the closure 10 is aligned with the neck portion 14. As shown, the lower end of the skirt 24 may be slightly flared to facilitate alignment. The closure 10 is lowered into contact with the neck portion 14. The retaining tabs 88 (now extending perpendicular to or forming an acute angle with the annular wall 86) will contact the external thread 18 and annular shoulder 20 of the neck portion 14 and flex to a position 88A. As the outer free end 94 of the retaining tabs 88 clear the shoulder 20, they will spring back to a position 88B wherein the outer free end is in contact with the outer surface 16 of the neck portion 14. Depending on the original orientation of the retaining tabs 88, a biasing force may be created against the outer surface 16. As the internal closure thread 30 engages the external container thread 18 during the capping operation, the upward sloped surface 54 of the second annular seal 50 will contact the upper edge 72 of the neck portion 14 and deform the second annular seal radially inwardly until the apex 58 of the second annular seal contacts the inner surface 64 of the neck portion to thereby bias the first and second annular seals against the neck portion. As the closure is twisted further onto the neck portion, the third annular seal 70 will seat against the upper edge 72 with the upper surface 40 of the internal thread 30 in sealing contact with the lower surface 44 of the outer thread 18. Any attempt to remove the closure 10 from the container 12 will cause the retaining tabs 88 to contact the annular shoulder 20 and break the ribs 82 (FIG. 4) to thereby separate the closure 10 from the security ring 26.

Figure 9:
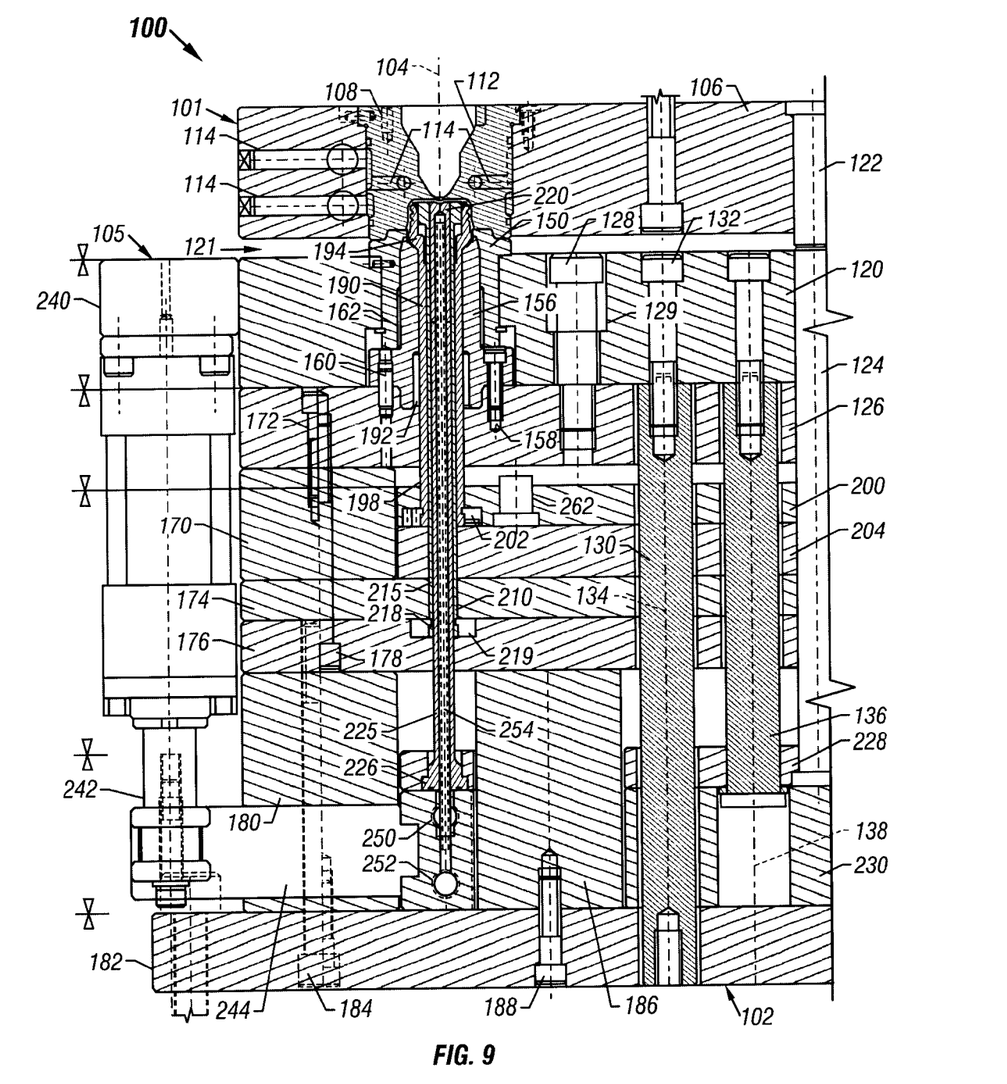
FIG. 9 is a cross sectional view of a portion of a molding device according to the invention for forming the container closure.

Referring now to FIG. 9, an injection molding device 100 according to the present invention for molding the closure 10 is illustrated. The injection molding device 100 includes an upper mold portion 101 and a lower mold portion 102 that are slidably connected to a frame (not shown) in a well-known manner for movement in a direction parallel to the axis 104, as will be described in greater detail below.

Figure 10:
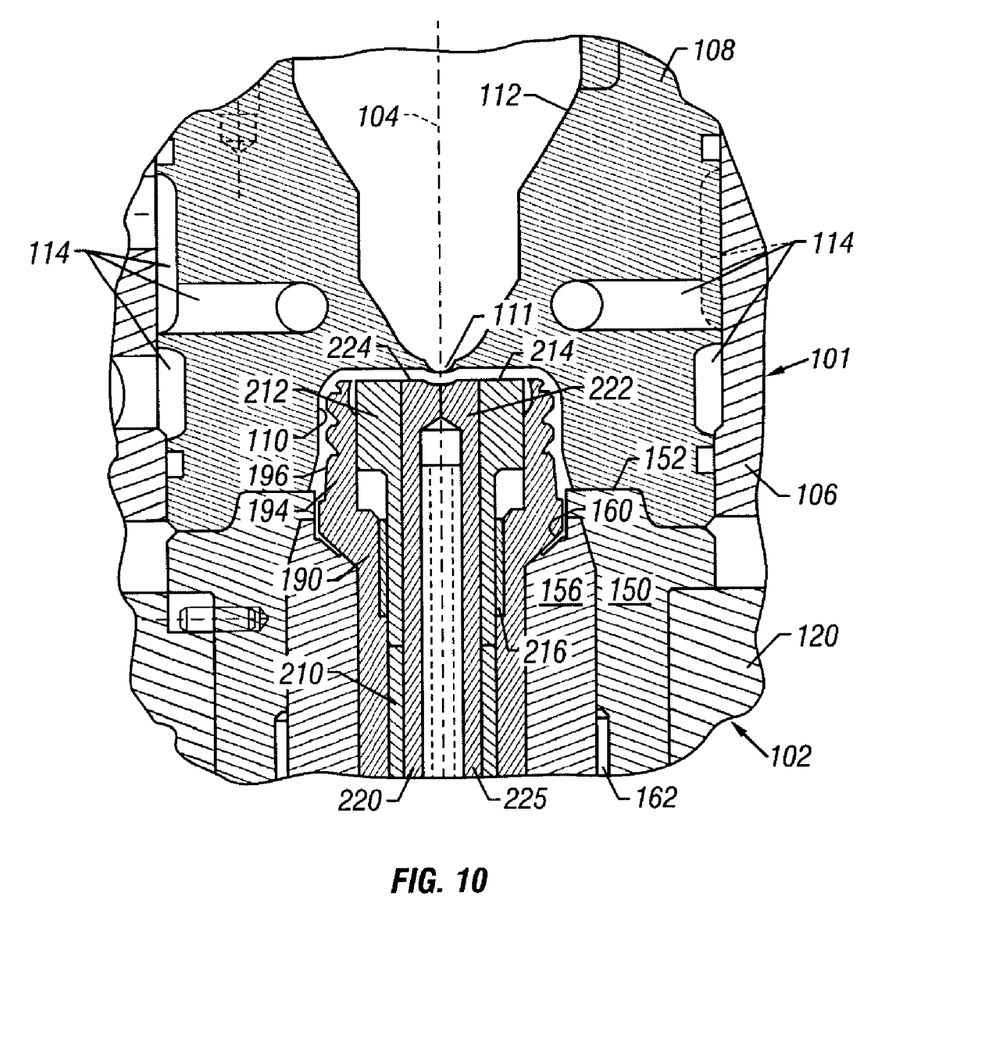
FIG. 10 is an enlarged cross sectional view of a cavity portion of the molding device of FIG. 9.

With additional reference to FIG. 10, the upper mold portion 101 includes a cavity plate 106 with a cavity insert 108 mounted thereto. A lower depression 110 is formed in the bottom of the insert 108 and an upper depression 112 is formed in the top of the insert. The inner surface of the lower depression 110 defines the outer surface of the closure 10. The upper depression 112 is in communication with the lower depression 110 through an orifice 111 and is adapted to receive an injection nozzle tip (not shown) for delivering plastic material under heat and pressure to the lower depression. Fluid passageways 114 extend through the cavity plate 106 and insert 108. A cooling fluid flows through the passageways during the molding process to keep the insert 108 below a predetermined maximum temperature.

As shown most clearly in FIG. 9, the lower mold portion 102 includes a stripper plate 120 that faces the cavity plate 106 and is normally separated from the cavity plate by a gap 121 when the upper mold portion is in a closed position for forming the closure 10. A stop pin 122 in the cavity plate 106 contacts a corresponding stop pin 124 in the lower mold portion 102 for maintaining the gap 121. A core plate 126 abuts the stripper plate 120 and is slidably connected to the stripper plate through a guide pin 128 that fits within a stepped bore 129 of the stripper plate. A first drive rod 130 is connected to the stripper plate 120 through a threaded fastener 132. The first drive rod 130 is constrained for movement along an axis 134 parallel to the axis 104 and may be moved through actuation of a linear drive unit (not shown), such as a hydraulic drive cylinder. A second drive rod 136 is also connected to the stripper plate 120 and is constrained for movement along an axis 138 parallel to the axis 104 and is also moved through actuation of a linear drive unit (not shown).

With additional reference to FIG. 10, a stripper ring 150 is connected to the stripper plate 120 for movement therewith. The stripper ring 150 includes an upper annular shoulder 152 that defines the lower surface 80 (FIG. 1) of the skirt 24 and a portion of the security ring 26. The shoulder 152 is also used to push against the surface 80 during ejection of the closure 10 from the injection molding device 100.

An outer core 156 is mounted to the core plate 126 through a fastener 158 and a pin 160. The outer core 156 is normally positioned in the stripper ring 150 during the molding operation. A bushing 162 made of brass or the like is located between the outer core 156 and stripper ring 150 so that the stripper ring 150 may slide in the direction of axis 104 during an ejection cycle. The outer core 156 includes an inner surface 160 that defines the outer surface of a portion of the security ring 26 (FIG. 1), including the retaining tabs 88.

The core plate 126 is connected to an upper spacer plate 170 through a fastener 172. The upper spacer plate 170 is in turn connected to a retainer plate 174 and a stationary support plate 176 through a fastener 178. The support plate 176 is in turn connected to a lower spacer plate 180 and a base plate 182 through a fastener 184. In this manner, the base plate 182, the lower spacer plate 180, the support plate 176, the retainer plate 174, the upper spacer plate 170, and the core plate 126 are secured together against relative movement and are stationary with respect to other portions of the mold assembly that move during an ejection cycle, as will be described in greater detail below. A supporting pillar 186 extends between the base plate 182 and the support plate 176 and is mounted to the base plate 182 with a threaded fastener 188.

A threaded core 190 is slidably received within the outer core 156. A bushing 192 made of brass or the like is located between the threaded core 190 and the outer core 156 so that the threaded core may slide in the direction of axis 104 during an ejection cycle. The threaded core 190 has a head 194 with an outer surface 196 that defines the asymmetrical internal helical thread 30 (FIG. 1), as previously described. As shown best in FIG. 13, the asymmetrical, external helical thread includes a crown 193, a lower thread surface 195 extending generally downwardly and away from the crown, and an upper thread surface 197 extending generally upwardly and away from the crown. A length of the lower thread surface is preferably greater than a length of the upper thread surface to thereby form the asymmetrical shape.

The outer surface 196 of the threaded core 190 also defines the inner surface of the security ring 26, the first annular seal 32, the third annular seal 72, as well as a portion of the second annular seal 50 of the closure 10 (FIG. 1). A lower end 198 of the threaded core 190 is mounted to an upper ejector retainer plate 200 through a locking ring 202. The upper ejector retainer plate 200 is in turn mounted to an upper ejector plate 204 through a threaded fastener (not shown). A drive cylinder (not shown) extends between the stationary plates 174, 176 and the upper ejector plates 200, 204 for driving the upper ejector plates in the direction of axis 104 during an ejection cycle. Movement of the upper ejector plates 200, 204 causes corresponding movement of the threaded core 190.

An inner core 210 is located in the threaded core 190. The inner core 210 includes an upper head portion 212 and a tubular member 215 that extends from the head portion. An upper surface 214 of the head portion 212 defines a portion of the lower surface 52 (FIG. 1) of the closure 10. The tubular member 215 has a lower end 218 that terminates at the stationary plate 176 through a locking ring 219. A bushing 216 made of brass or the like is located between the inner core 210 and the threaded core 190 so that the threaded core 190 may slide in the direction of axis 104 with respect to the inner core 210 during an ejection cycle. With its connection to the stationary plate 176, the inner core 210 will not move during the ejection cycle.

An ejector pin 220 is slidably positioned in the inner core 210. The ejector pin 220 includes an upper ejector head portion 222 and a tubular member 225 that extends from the upper ejector head portion. An upper surface 224 of the upper ejector head portion 222 defines a portion of the lower surface 52 (FIG. 1) of the closure 10. The tubular member 225 has a lower end 226 that terminates at a lower ejector retainer plate 228. The lower ejector retainer plate 228 is in turn mounted to a lower ejector plate 230 through a threaded fastener (not shown). The lower ejector plate 230 is driven by the drive cylinder 105 to thereby move the ejector pin 220 along the axis 104 during an ejection cycle.

The drive cylinder 105 includes a housing 240 that is mounted to the stripper plate 120 and a reciprocal shaft 242 that is mounted to the lower ejector plate 230 through a connecting arm 244. The shaft 242 is normally in an extended position and is retracted into the housing during an ejection cycle for driving the lower ejector plates 228 and 230 in the direction of axis 104 during an ejection cycle. Movement of the lower ejector plates 228, 230 in turn causes corresponding movement of the ejector pin 220 with respect to the stripper plate 120. When the cylinder 105 is in the normally extended position and the stripper plate 120 is moved by the first drive rod 130, the lower ejector plates 228, 230 and ejector pin 220 are moved together, as will be described in greater detail below.

The lower ejector plate 230 includes openings 250 and 252 that are in fluid communication with an inner bore 254 of the ejector pin tubular member 225 for recirculating cooling fluid to the mold cavity in a well-known manner.

Although the molding device 100 is shown with only a single mold cavity, it is to be understood that a plurality of mold cavities may be provided in conjunction with the previously described mold plates and other components.

In use, and with reference to FIGS. 9 to 14, the injection molding device 100 is in the position as shown in FIG. 9 during a molding operation. Once the molding operation is completed and the closure 10 is formed, the molding device 100 enters a four-stage ejection cycle to eject the closure 10.

Figure 11:
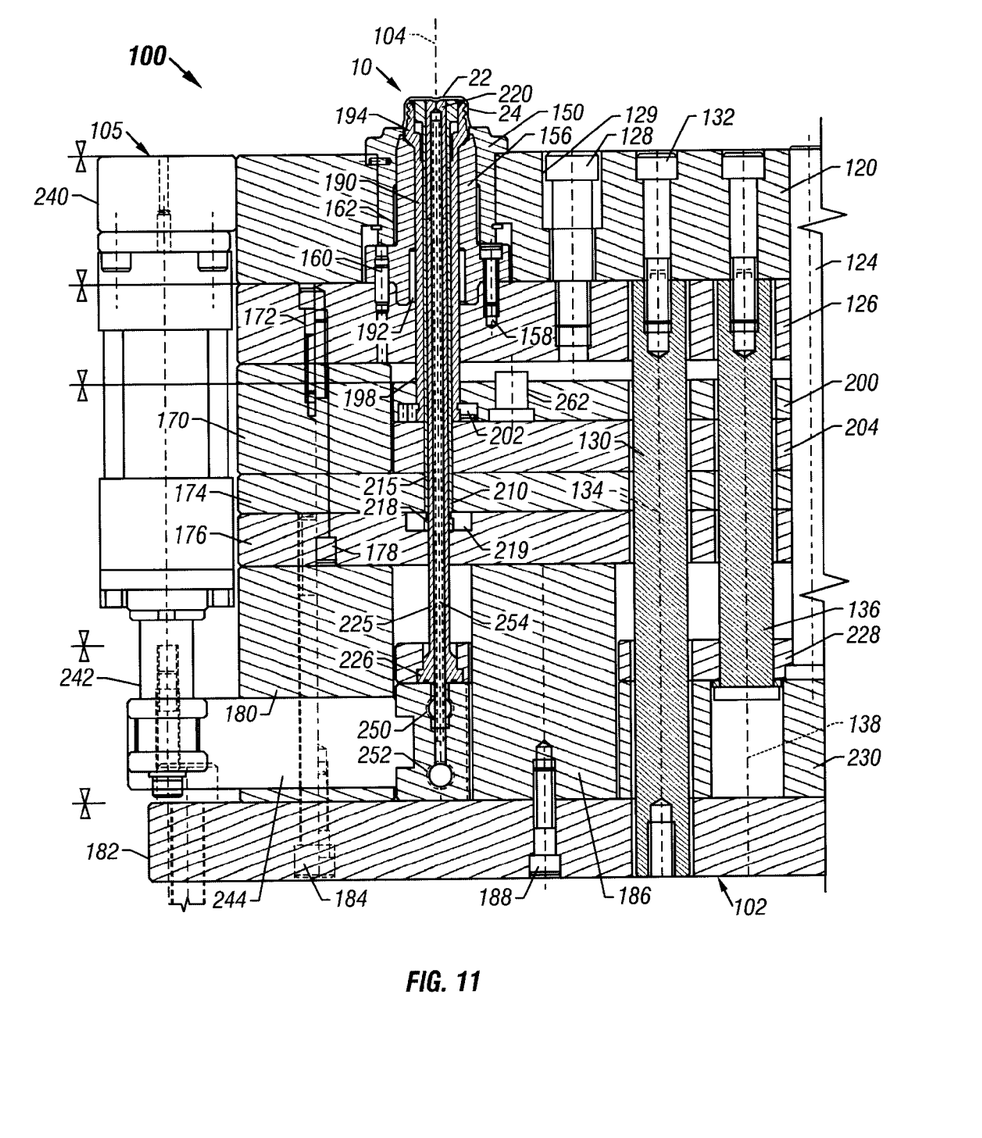
FIG. 11 is a cross sectional view of the molding device at a first ejection stage for ejecting the container closure after forming.

FIG. 11 shows the injection molding device 100 at the first stage of the ejection cycle. During this stage, the upper mold portion 101, which includes the cavity plate 106 and cavity insert 108, is moved away from the stripper plate 120 to expose the outer surfaces of the upper wall 22 and skirt 24 of the closure 10.

Figure 12:
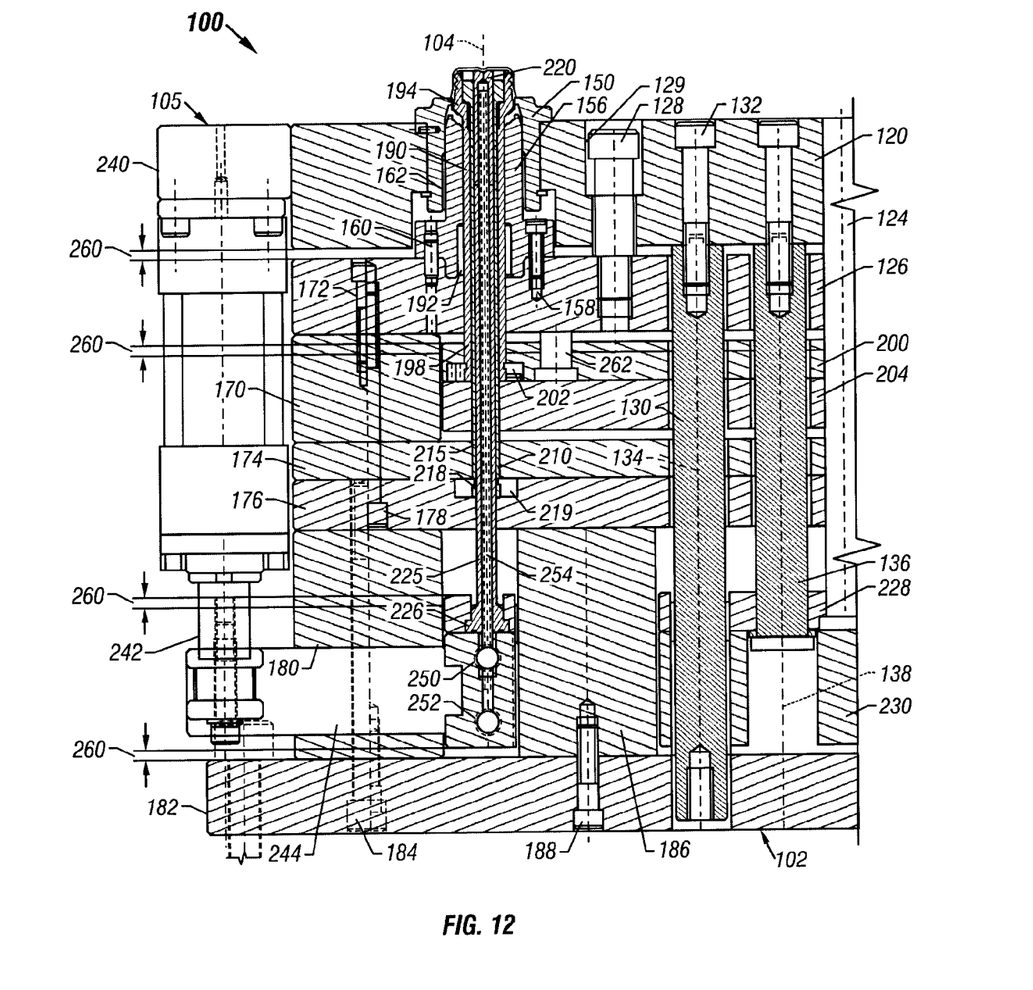
FIG. 12 is a cross sectional view of the molding device at a second ejection stage.
Figure 13:
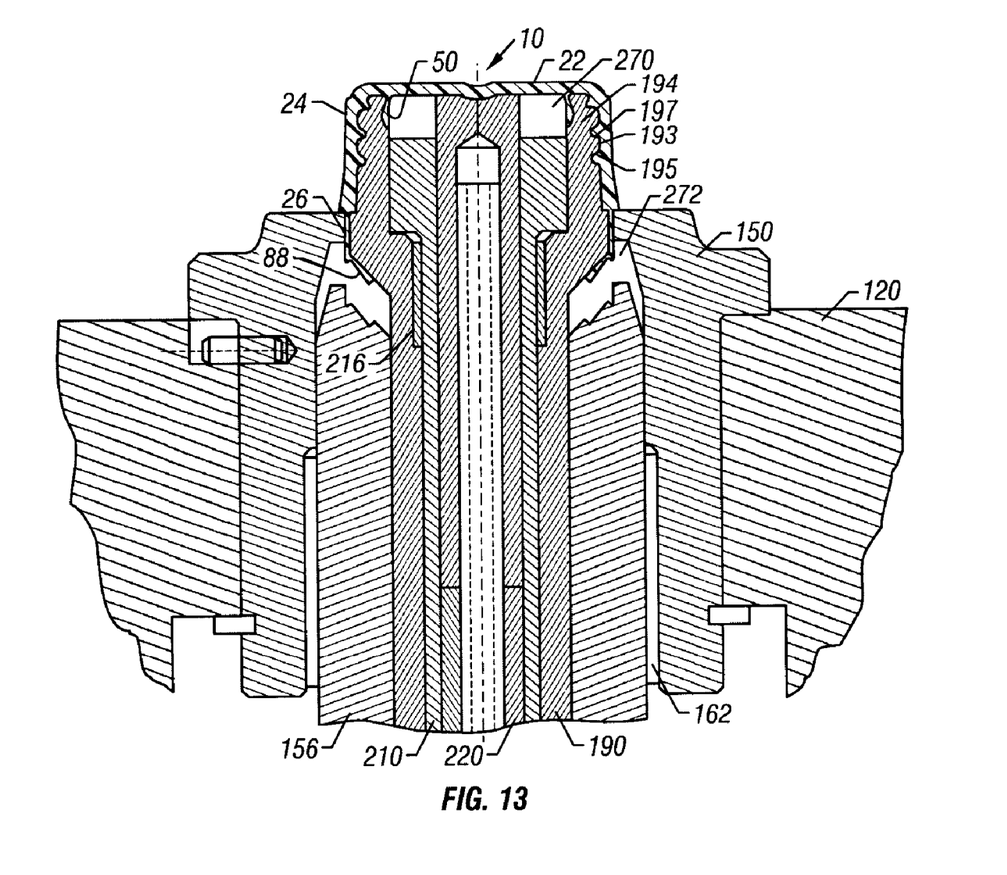
FIG. 13 is an enlarged cross sectional view of the molding device at the second stage and illustrating the relative position between the closure and various components of the molding device.

FIGS. 12 and 13 show the molding device 100 at the second stage of the ejection cycle. During the second stage, the stripper plate 120 with the attached stripper ring 150 are moved a distance 260 by the first drive rod 130. The drive cylinder 105 moves with the stripper plate 120 and is not actuated during this stage. Since the shaft 242 of the drive cylinder 105 is connected to the lower end 226 of the ejector pin 220, the ejector pin will also be moved the distance 260. Simultaneously, the threaded core 190 is moved the distance 260 through a drive cylinder (not shown) connected between the stationary core plate 126 and the upper ejector retainer plate 200. A stop pin 262 projecting upwardly from the upper ejector retainer plate 200 prevents further movement of the threaded core in case of a machine malfunction to thereby prevent or reduce damage to the molding device 100. The outer core 156 and the inner core 210 remain stationary during the second stage of the ejection cycle since they are connected to the stationary plates 126 and 176, respectively. Movement of the stripper ring 150, ejector pin 220, and threaded core 190 with respect to the outer core 156 and inner core 210 creates a first clearance space 270 between the ejector pin 220 and the threaded core 190, and a second clearance space 272 between the threaded core 190 and the outer core 156. The first clearance space 270 allows for inward flexure of the second annular seal 50 and outward flexure of the spaced retaining tabs 88 of the closure 10 during the third ejection stage, as will be described in greater detail below.

Figure 14:
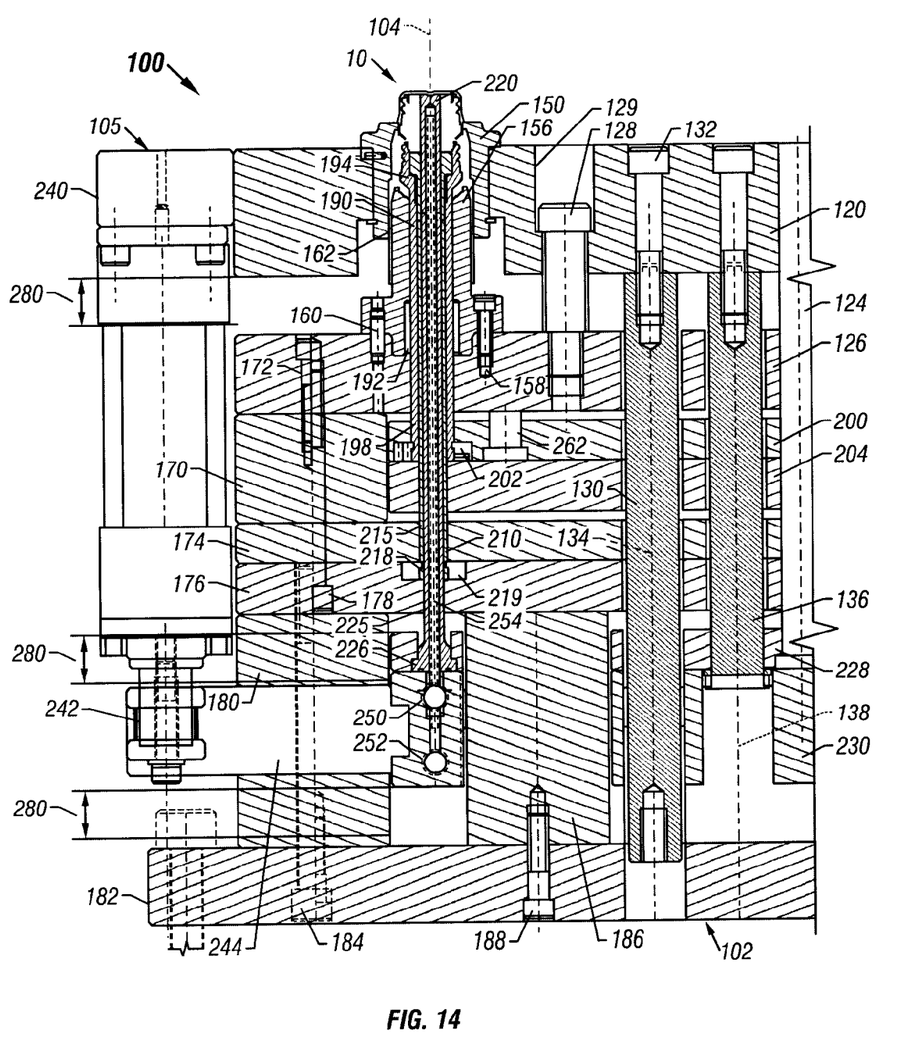
FIG. 14 is a cross sectional view of the molding device at a third ejection stage.

FIG. 14 shows the molding device 100 at the third stage of the ejection cycle. During the third stage, the stripper plate 120 with the attached stripper ring 150 are moved a distance 280 by the first drive rod 130 which is preferably greater than the distance 260 previously described. The drive cylinder 105 moves with the stripper plate 120 and is not actuated during this stage. Since the shaft 242 of the drive cylinder 105 is connected to the lower end 226 of the ejector pin 220, the ejector pin will also be moved the distance 280. The threaded core 190 is stationary during the third stage. Movement of the stripper ring 150 and the drive cylinder 105 with respect to the threaded core 190 causes the second annular seal 50 to collapse into the first clearance space 270 and the retaining tabs 88 to deform into the second clearance space 272. The asymmetrical internal helical thread 30 of the closure 10 together with the outer surface 196 of the threaded core 190 that forms the helical thread 30, enables linear release of the closure from the threaded core in the direction of axis 104, preferably with insubstantial deflection of the closure 10. This feature greatly increases the production rate of container closures and decreases mold costs over the prior art where the core must be rotated out of the closure interior. Linear removal of the core is preferably accomplished while the material is still warm, but after it is set in the mold. In the final stage three position, the closure 10 is retained on the stripper ring 150 by the security ring 26.

Figure 15:
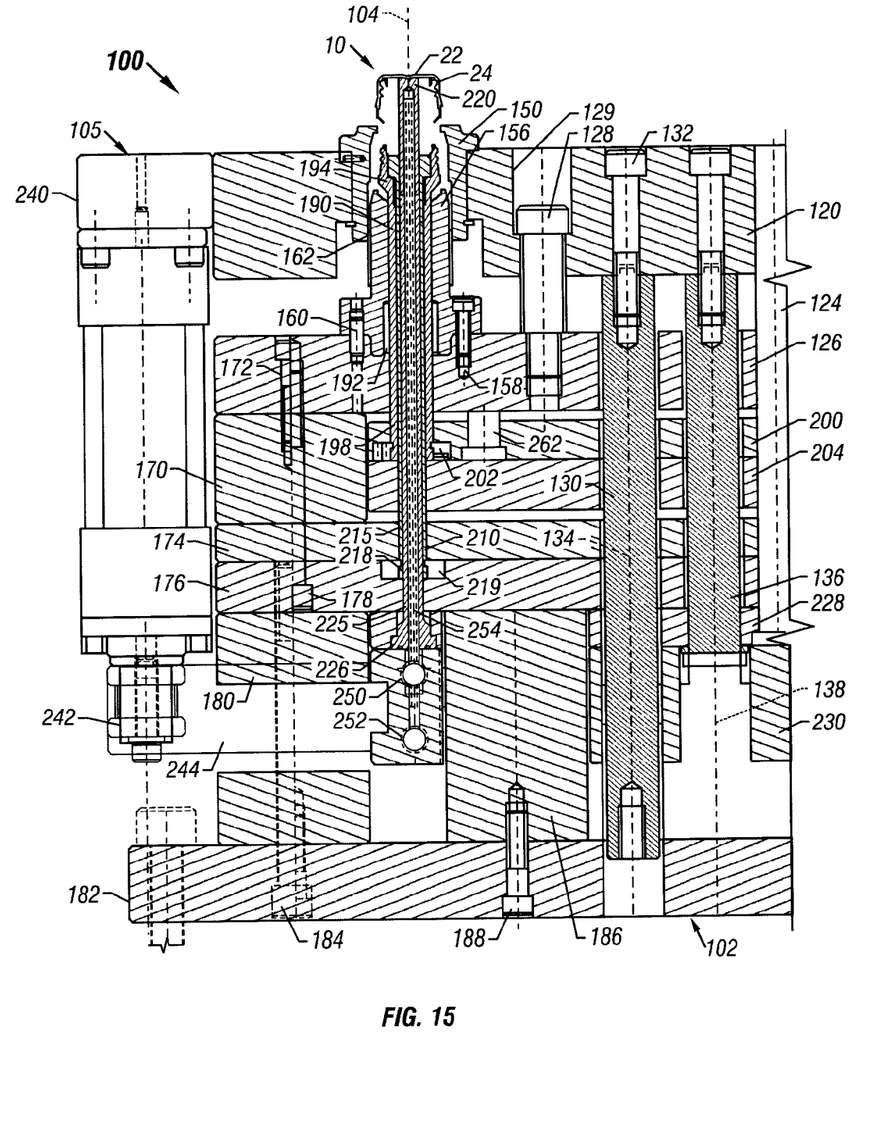
FIG. 15 is a cross sectional view of the molding device at a fourth ejection stage.

FIG. 15 shows the molding device 100 at the fourth stage of the ejection cycle. During the fourth stage, the stripper plate 120 and stripper ring 150 are held stationary while the drive cylinder 105 is actuated to retract the shaft 242 into the drive cylinder housing 240. Retraction of the shaft 242 into the housing 240 forces the ejector pin 220 upwardly with respect to the stripper ring 150. During movement of the ejector pin 220, the security ring will tend to collapse slightly inwardly toward the axis 104 until it is clear of the stripper ring 150. Compressed air or other fluid can be used in a well-known manner to help separate the closure 10 from inner core, if needed. The components of the mold device 100 can then be moved to their original position for subsequent molding and ejection cycles.

Although the closure 10 and molding device 100 have been shown and described in a particular orientation, it is to be understood that the invention is not limited thereto. The molding device 100 may be in any orientation to form the closure 10. Likewise, the closure 10 may be connectable to a bottle or other container in any orientation. Accordingly, the terms upper, lower, upward, downward, and their respective derivatives and equivalent terms as may be used throughout the specification, including the claims, denote relative, rather than absolute positions or orientations.

While the invention has been taught with specific reference to the above-described embodiments, those skilled in the art will recognize that changes can be made in form and detail without departing from the spirit and the scope of the invention. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A mold assembly for a container closure having an end wall and a skirt extending from the end wall, the skirt having an inner skirt surface with an internal, asymmetrical helical thread formed thereon for engaging an external helical thread of a container, the internal, asymmetrical helical thread having a ramped surface, a security ring frangibly connected to the skirt, and a shoulder extending between the security ring and the skirt, the mold assembly comprising:

first and second mold portions cooperating to define, in a closed position, a closure cavity;

the second mold portion having:

a stripper ring adapted for engaging the shoulder of the closure; and a threaded core having an external, asymmetrical helical thread defining the internal, asymmetrical helical thread of the closure, the external, asymmetrical helical thread having a ramped surface defining the ramped surface of the internal, asymmetrical helical thread;

wherein relative linear movement between the stripper ring and the threaded core causes withdrawal of the threaded core from the closure in a linear direction, with the ramped surfaces of the internal and external, asymmetrical helical threads cooperating to facilitate the withdrawal.

2. A mold assembly according to claim 1, and further comprising an inner core located in the threaded core, the inner core and threaded core cooperating to define an annular seal on the end wall of the closure.

3. A mold assembly according to claim 2, wherein relative movement between the inner core and threaded core creates a first clearance space into which the annular seal can deform during ejection of the closure from the mold assembly.

4. A mold assembly according to claim 3, and further comprising an outer core surrounding the threaded core, the outer core and threaded core cooperating to define at least a flap portion of the security ring.

5. A mold assembly according to claim 4, wherein relative movement between the outer core and threaded core creates a second clearance space into which the flap portion of the security ring can deform during ejection of the closure from the mold assembly.

6. A mold assembly according to claim 5, wherein the inner and outer cores are at least substantially simultaneously movable with respect to the threaded core so that the first and second clearance spaces are at least substantially simultaneously formed.

7. A mold assembly according to claim 1, and further comprising an outer core surrounding the threaded core, the outer core and threaded core cooperating to define at least a flap portion of the security ring.

8. A mold assembly according to claim 7, wherein relative movement between the outer core and threaded core creates a clearance space into which the flap portion of the security ring can deform during ejection of the closure from the mold assembly.

9. A mold assembly according to claim 1, wherein the external, asymmetrical helical thread comprises:
   a crown;
   a lower thread surface extending generally downwardly and away from the crown; and
   an upper thread surface extending generally upwardly and away from the crown;
   wherein a length of the lower thread surface is greater than a length of the upper thread surface to thereby form the asymmetrical shape.

10. A mold assembly according to claim 9, wherein the lengths are arc lengths.

11. A mold assembly for a container closure having an end wall, an annular seal and a skirt extending from the end wall and a frangible security ring extending from the skirt, the mold assembly comprising:
   first and second mold portions cooperating to define, in a closed position, a closure cavity;
   the second mold portion having:
      a threaded core;
      an inner core located in the threaded core, the inner core and threaded core cooperating to define an annular seal on the end wall of the closure, wherein relative movement between the inner core and threaded core creates a first clearance space into which the annular seal can deform during ejection of the closure from the mold assembly;
      an outer core surrounding the threaded core, the outer core and threaded core cooperating to define at least an inwardly extending flap portion of the security ring, wherein relative movement between the outer core and threaded core creates a second clearance space into which the flap portion of the security ring can deform outwardly during ejection of the closure from the mold assembly.

12. A mold assembly according to claim 11, wherein the inner and outer cores are at least substantially simultaneously movable with respect to the threaded core so that the first and second clearance spaces are at least substantially simultaneously formed.

13. A mold assembly according to claim 11, wherein the closure has a shoulder between the skirt and the frangible security ring, and further comprising a stripper ring surrounding the outer core, the stripper ring together with the threaded core and the outer core defining the frangible security ring and the shoulder of the closure.

14. A mold assembly assembly according to claim 13, wherein relative linear movement between the stripper ring and the threaded core causes withdrawal of the threaded core from the closure in a linear direction.

* * * * *